US008805979B2

(12) United States Patent
Touboul et al.

(10) Patent No.: US 8,805,979 B2
(45) Date of Patent: *Aug. 12, 2014

(54) METHODS AND SYSTEMS FOR AUTO-MARKING, WATERMARKING, AUDITING, REPORTING, TRACING AND POLICY ENFORCEMENT VIA E-MAIL AND NETWORKING SYSTEMS

(75) Inventors: Shlomo Touboul, Kehar-Haim (IL); Robert Edward Yusin, Dublin, CA (US)

(73) Assignee: Alearo Properties Limited Liability Company, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/471,345

(22) Filed: May 14, 2012

(65) Prior Publication Data
US 2012/0278862 A1 Nov. 1, 2012

Related U.S. Application Data

(62) Division of application No. 10/680,962, filed on Oct. 7, 2003, now Pat. No. 8,200,793.

(60) Provisional application No. 60/420,035, filed on Oct. 22, 2002.

(51) Int. Cl.
*G06F 15/177* (2006.01)

(52) U.S. Cl.
USPC .......................................................... 709/222

(58) Field of Classification Search
USPC .......................................................... 709/222
See application file for complete search history.

(56) References Cited

U.S. PATENT DOCUMENTS

| 5,764,898 | A | 6/1998 | Tsuji et al. |
|---|---|---|---|
| 6,158,003 | A | 12/2000 | Kara |
| 6,507,866 | B1 | 1/2003 | Barchi |
| 6,640,301 | B1 | 10/2003 | Ng |
| 6,769,061 | B1 | 7/2004 | Ahem |
| 7,035,830 | B1 | 4/2006 | Shaikh |
| 2002/0035584 | A1 | 3/2002 | Scheier et al. |
| 2002/0042815 | A1 | 4/2002 | Salzfass et al. |
| 2002/0116531 | A1 | 8/2002 | Chu |
| 2004/0001606 | A1 | 1/2004 | Levy |

*Primary Examiner* — Maceeh Anwari
(74) *Attorney, Agent, or Firm* — Stolowitz Ford Cowger LLP

(57) ABSTRACT

A method for tracking the routing of an electronic document, including embedding a unique identifier within an electronic document and monitoring e-mail messages transmitted from senders to recipients, for detection of e-mail messages having the electronic document embedded therewithin or attached thereto, based on the unique identifier. A system and computer readable storage medium are also described and claimed.

28 Claims, 3 Drawing Sheets

METHODS AND SYSTEMS FOR AUTO-MARKING, WATERMARKING, AUDITING, REPORTING, TRACING AND POLICY ENFORCEMENT VIA E-MAIL AND NETWORKING SYSTEMS

PRIORITY REFERENCE TO RELATED APPLICATIONS

This application is a divisional of and claims priority to U.S. patent application Ser. No. 10/680,962 filed Oct. 7, 2003, now issued as U.S. Pat. No. 8,200,793, which claims benefit of and claims priority to U.S. provisional application No. 60/420,035, filed on Oct. 22, 2002, all of which are incorporated herein by reference in their entirety.

FIELD OF THE INVENTION

The present invention relates to security of corporate data, and more specifically to tracking of document distribution.

BACKGROUND OF THE INVENTION

Today, corporate and personal information is transmitted from person to person primarily over computer networks. Typically, information in the form of text and graphics is stored within electronic documents, including inter alia Microsoft Word documents, Adobe PDF documents, HTML documents, XML documents, Microsoft Excel spreadsheets, Microsoft PowerPoint presentations and database files. Such documents are generally transmitted as e-mail attachments using a Simple Mail Transport Protocol (SMTP), as File Transfer Protocol (FTP) downloads, as Hyper-Text Transport Protocol (HTTP) downloads, or as Instant Messenger (IM) downloads.

A major security concern is control of access to documents that contain sensitive information. Conventional access control uses passwords to protect document files.

A drawback with prior art access control technology is the lack of ability to trace the distribution route of a document as it travels through computer networks from one or more sources to one or more destinations. Organizations need to track the flow of sensitive documents within the organization, and to track when documents leave the organization and the destinations to which they are sent.

SUMMARY

Embodiments of the present invention provide a method and system for tracking the routing of an electronic document, and for ensuring that access is limited to authorized recipients. Embodiments of the present invention track the routing path of a document by generating an audit record when the document is transmitted within a network, based on a unique identifier embedded within the document and used to identify the document. Use of an embedded identifier serves to overcome failures to recognize a document due to document editing, or due to modification of document and file metadata, such as file name and document author.

Preferably, activity is logged in an audit record when a document is transferred to a recipient, and the audit records generated for a specific document provide a detailed description of the distribution route of the document. Audit records can be viewed on a per-document basis, on a per-user basis and on the basis of a specified time period. Preferably, a reporting tool generates routing reports based on audit records, and a notification tool notifies one or more designated administrators of attempts to alter the unique identifiers embedded within documents.

Using the present invention, an organization can track the routing history and current whereabouts of a document, and determine if the document was distributed to people who do not have authorization to access it. Similarly, an organization can track when a document leaves and re-enters the organization; for example, when a contract was sent to legal counsel for review and when the contract re-entered the organization. Embodiments of the present invention provide auditing reports describing in detail the movements of documents within a corporate e-mail system, as well as exit and entry within the organization.

Moreover, embodiments of the present invention ensure that for each source-to-destination transmission of the document, the source has requisite authorization to send the document and the destination has requisite authorization to receive the document.

Embodiments of the present invention are both operating system platform independent and transport protocol independent, and run on diverse platforms without requiring additional third-party software or hardware components.

There is thus provided in accordance with an embodiment of the present invention a method for tracking the routing of an electronic document, including embedding a unique identifier within an electronic document and monitoring e-mail messages transmitted from senders to recipients, for detection of e-mail messages having the electronic document embedded therewithin or attached thereto, based on the unique identifier.

There is further provided in accordance with an embodiment of the present invention a system for tracking the routing of an electronic document, including an auto-marker for embedding a unique identifier within an electronic document, and a traffic monitor for monitoring e-mail messages transmitted from senders to recipients, and for detecting e-mail messages having the electronic document embedded therewithin or attached thereto, based on the unique identifier.

There is yet further provided in accordance with an embodiment of the present invention a computer-readable storage medium storing program code for causing a computer to perform the steps of embedding a unique identifier within an electronic document, and monitoring e-mail messages transmitted from senders to recipients, for detection of the electronic document embedded therewithin or attached thereto, based on the unique identifier.

There is additionally provided in accordance with an embodiment of the present invention a method for tracking the routing of an electronic document, including embedding a unique identifier within an electronic document, and monitoring transmitted network packets, for detection of network packets containing the electronic document, based on the unique identifier.

There is moreover provided in accordance with an embodiment of the present invention a system for tracking the routing of an electronic document, including an auto-marker for embedding a unique identifier within an electronic document, and a traffic monitor for monitoring transmitted network packets, and for detection of network packets containing the electronic document, based on the unique identifier.

There is further provided in accordance with an embodiment of the present invention a computer-readable storage medium storing program code for causing a computer to perform the steps of embedding a unique identifier within an electronic document, and monitoring transmitted network packets, for detection of network packets containing the electronic document, based on the unique identifier.

There is yet further provided in accordance with an embodiment of the present invention a method for controlling distribution of an electronic document within computer networks, including intercepting e-mail messages being transmitted from senders to recipients, scanning the intercepted e-mail messages for detection of a specified electronic document embedded therein or attached thereto, examining a policy to determine whether or not transmission of the document to a recipient is permitted, if the scanning detects an e-mail message having the electronic document embedded therein or attached thereto, and causing transmission of the document to the recipient to be blocked, if the examining determines that transmission is not permitted.

There is additionally provided in accordance with an embodiment of the present invention a system for controlling distribution of an electronic document within computer networks, including a traffic monitor for intercepting e-mail messages being transmitted from senders to recipients, a scanner for scanning the intercepted e-mail messages, and for detecting a specified electronic document embedded therein or attached thereto, a policy manager for examining a policy to determine whether or not transmission of the document to a recipient of an e-mail message is permitted, and a policy enforcer for causing transmission of the document to the recipient to be blocked.

There is moreover provided in accordance with an embodiment of the present invention a computer-readable storage medium storing program code for causing a computer to perform the steps of intercepting e-mail messages being transmitted from senders to recipients, scanning the intercepted e-mail messages for detection of a specified electronic document embedded therein or attached thereto, examining a policy to determine whether or not transmission of the document to a recipient is permitted, if the scanning detects an e-mail message having the electronic document embedded therein or attached thereto, and causing transmission of the document to the recipient to be blocked, if the examining determines that transmission is not permitted.

There is further provided in accordance with an embodiment of the present invention a method for controlling distribution of an electronic document within computer networks, including intercepting network packets transmitted over a computer network, scanning the intercepted network packets for detection of network packets containing a specified electronic document, examining a policy to determine whether or not transmission of the specified electronic document is permitted, if the scanning detects a network packet containing the specified electronic document, and causing transmission of the document to be blocked, if the examining determines that transmission is not permitted.

There is yet further provided in accordance with an embodiment of the present invention a system for controlling distribution of an electronic document within computer networks, including a traffic monitor for intercepting network packets transmitted over a computer network, a scanner for scanning the intercepted network packets and for detecting network packets containing a specified electronic document, a policy manager for examining a policy to determine whether or not transmission of the specified electronic document is permitted, and a policy enforcer for causing transmission of the document to be blocked.

There is additionally provided in accordance with an embodiment of the present invention a computer-readable storage medium storing program code for causing a computer to perform the steps of intercepting network packets transmitted over a computer network, scanning the intercepted network packets for detection of network packets containing a specified electronic document, examining a policy to determine whether or not transmission of the specified electronic document is permitted, if the scanning detects a network packet containing the specified electronic document, and causing transmission of the document to be blocked, if the examining determines that transmission is not permitted.

The following definitions are employed throughout the specification and claims.

Audit record—a record of a transaction, preferably including inter alia at least one recipient, a date and time, and, if appropriate, a sender.

Document, or electronic document—information in electronic form.

File, or document file—an electronic file storing a document and also storing document metadata, including inter alia document type, authoring application, title, subject, author and creation date.

Policy, or policy record—a record that defines permissions and access control for transfer of a document.

Transaction—a network traffic event or an e-mail event, whereby a designated document is sent from a source to a destination, or received by a destination from a source.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

Embodiments of the present invention provide a method and system for tracking the routing of an electronic document, and for ensuring that access to the document is limited to authorized recipients. Using the present invention an organization can track the flow of sensitive documents within the organization, and also track when documents leave the organization and the destinations to which they are sent.

Figure 1:
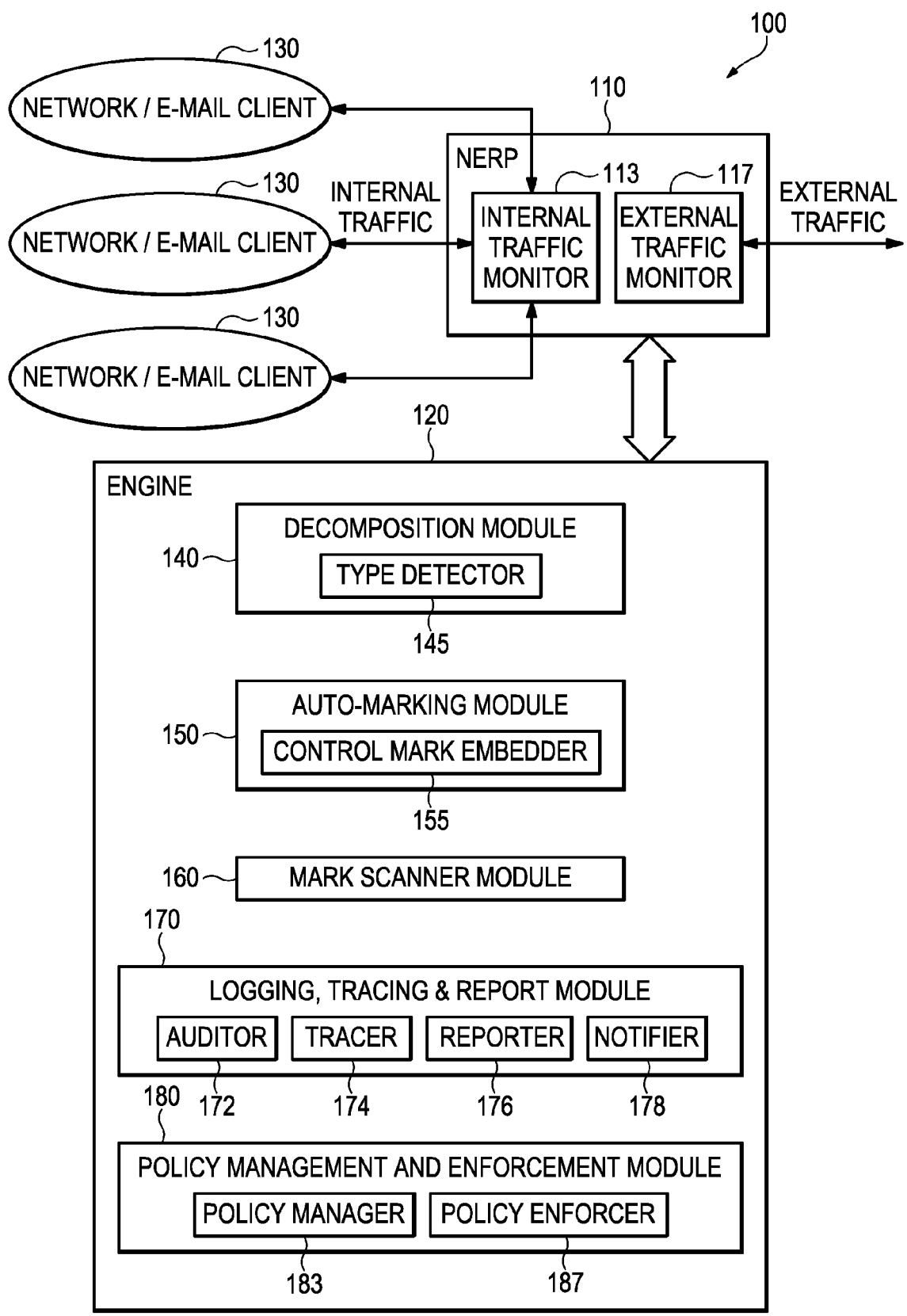
FIG. 1 is a simplified block diagram of a document route tracking system, in accordance with an embodiment of the present invention.

Reference is now made to FIG. 1, which is a simplified block diagram of a document route tracking system 100, in accordance with an embodiment of the present invention. In an embodiment, the present invention includes two primary modules: (i) a network/proxy/e-mail relay or plug-in, referred to as a "NERP Module" 110; and (ii) an auto-marking/auditing/reporting/tracing/access control engine, referred to as an "Engine Module" 120. NERP Module 110 monitors content of network packets and e-mail messages that contain attachments or embedded documents, and includes both an internal traffic monitor 113 for files transferred to clients 130 internally within an organization, and an external traffic monitor 117 for files transferred externally into or out of an organization. NERP Module 110 is preferably configured (i) as a network proxy; (ii) as a network plug-in to a network proxy, such as Microsoft ISA; (iii) as a plug-in to a firewall, such as a Checkpoint firewall; (iv) as a mail relay; or (v) as a plug-in to an e-mail server, such as Microsoft Exchange Server, Lotus Notes Server and Linux Send Mail Server.

Engine Module 120 preferably scans content intercepted by the NERP module, and implements the functions of auto-marking, auditing, reporting, tracing and access control. In an embodiment of the present invention, Engine Module 120 includes five sub-modules, as follows:

a Decomposition Module 140;
an Auto-Marking Module 150;
a Mark Scanner Module 160;
a Logging, Tracing and Reporting Module 170; and
an Access Policy Management and Enforcement Module 180.

Decomposition Module 140 includes a type detector 145, which identifies the type of a file being transmitted. Preferably, types include inter alia Microsoft Word document, Microsoft Excel spreadsheet, Microsoft PowerPoint presentation, Adobe PDF document, HTML document and XML document.

It may be appreciated by those skilled in the art that the file wrapper for an electronic document may be a misleading indicator for the type of the document. File metadata such as file name, file size and MIME type, and document metadata such as title, subject and author, can be arbitrarily modified. An important feature of an embodiment of the present invention is that type identification is not based on file and document metadata, which can be misleading. Instead, type identification preferably involves analyzing binary contents of the file, and parsing the file into its basic constructs including inter alia, for example, Microsoft Office version number, Microsoft Office authoring application, document encryption properties, content text, description text, graphic and other embedded objects, and properties description.

In an embodiment of the present invention, Auto-Marking Module 150 generates a unique identifier for a document, and includes a mark embedder 155, which embeds a control mark including the identifier within the file. The control mark also includes data, such as an encrypted check sum, for self-authentication and self-validation. Whenever the document is intercepted by NERP module 110 in transit, Mark Scanner Module 160 checks the control mark to ensure that it is intact and has not been tampered with.

Many documents include a summary information section which can store custom properties that remain static, regardless of how the document is edited by a document editor. In an embodiment of the present invention, such a custom property is used to store the unique identifiers for documents, and the identifiers are used as a key ID within a relational database table that stores records that track flows of the documents. Microsoft Office documents, for example, use structured storage to include static properties within Word documents, Excel spreadsheets and PowerPoint presentations. Such properties are typically located within a summary information storage.

Many documents are tagged with unique static identifiers at the time of their creation, in which case an embodiment of the present invention uses such identifiers, or identifiers derived therefrom by a hashing algorithm or another algorithm, as key IDs for the documents.

Mark Scanner Module 160 is able to screen and modify intercepted content, including inter alia e-mail messages and network packets that contain attachments or embedded documents. Mark Scanner Module 160 preferably extracts the control mark embedded within a document and verifies it for authentication and validity. In some packet-based embodiments, the Mark Scanner Module 160 may assemble the packets to review the entire document content, since individual packet content may be insufficient to do any type of meaningful review. However, one skilled in the art will appreciate that other packet-based scanning techniques may also be possible. If Mark Scanner Module 160 detects that the control mark of a file has been tampered with, it issues a notification via Logging, Tracing and Reporting Module 170.

In an embodiment of the present invention, Mark Scanner Module 160 is installed for an e-mail or other network system. Mark Scanner Module 160 is implemented (i) as a plug-in to an e-mail system, such as Microsoft Exchange, IBM Lotus Notes, and Linux Send Mail; (ii) as a plug-in to a network gateway, such as Checkpoint Firewall-1, Microsoft Proxy, Microsoft ISA Server, caching devices, and an FTP proxy server; or (iii) as its own gateway for e-mail and other network traffic.

Logging, Tracing and Reporting Module 170 includes an Auditor 172, a Tracer 174, a Reporter 176 and a Notifier 178, respectively for auditing, tracing and reporting transactions involving an electronic document, and for notifying one or more specified people of attempted security violations. As mentioned hereinabove, a "transaction" is a network traffic event or an e-mail event, whereby a designated document is sent from a source to a destination, or received by a destination from a source. Preferably, whenever a designated document is transferred, the corresponding transaction is logged. For example, Auditor 172 may audit a transaction whereby an e-mail message sent from a sender to one or more recipients includes an embedded Word document, or includes an attachment with a PowerPoint presentation.

Preferably, Auditor 172 records inter alia one or more of: (i) the date and time of the transaction; (ii) the sender, if appropriate; (iii) all recipient lists, including TO, CC and BCC; (iv) the message content; (v) the document control mark; (vi) the document file "last saved as" name; and (vii) the document file metadata, such as creation date, document author name and statistics. In an embodiment of the present invention, auditing reports are created by default for incoming and outgoing attachments, and for Microsoft Office Word, Excel and PowerPoint documents. In addition, a user can set configuration parameters for document auditing, including inter alia message direction [incoming, outgoing or both], and document type [Word, Excel, HTML, PDF, PowerPoint, XML or a combination thereof].

Audit records generated by Auditor 172 provide the basic information necessary to track the distribution route of a document. Tracer 174 traces the route of one or more designated documents, based on their unique identifiers. It is noted that the present invention is able to audit, trace and log transactions involving a designated document, even if the document file's metadata are changed en route, by virtue of the embedded identifier.

Reporter 176 preferably generates a global organization report for transactions associated with designated documents, and provides visualization tools for viewing statistics regarding transactions, policy violation attempts (described herein below), and attempts to modify control marks. Preferably, an administrator can configure Reporter 176 to (i) generate reports for one or more designated documents; (ii) generate reports on an individual user basis or on the basis of a group of users; (iii) generate reports for a specified time frame; and (iv) save reports in a specified format, such as HTML or CSV.

Notifier 178 sends important notifications, such as notifications about attempts to breach control policies as detected by Policy Management and Enforcement Module 180, to one or more designated people.

In an embodiment of the present invention, Auditor 172 is used to provide audit viewing capability for a designated document. Specifically, an audit viewer tool enables an administrator to view routing data for a designated document, and a list of audit records related to the document.

Policy Management and Enforcement Module 180 includes a Policy Manager 183 that generates access control policies, and a Policy Enforcer 187 that enforces control policies. As mentioned hereinabove, a "policy" is a record that defines permissions and access control for document transfer. For example, a policy may indicate that sending an e-mail message that includes an attachment or embedded Word document CONFIDENTIAL.DOC to one or more specific recipients is not permitted. Preferably, based on such a policy, if CONFIDENTIAL.DOC is included within a message being sent to the one or more specific recipients, Policy Enforcer 187 blocks the message from being delivered. Instead of delivering the message, Logging, Tracking and Reporting Module 170 registers a log event indicating an attempt to violate the control policy, and Notifier 178 sends an appropriate notification to a system administrator, or to the sender of the blocked message, or to one or more designated people.

Figure 2:
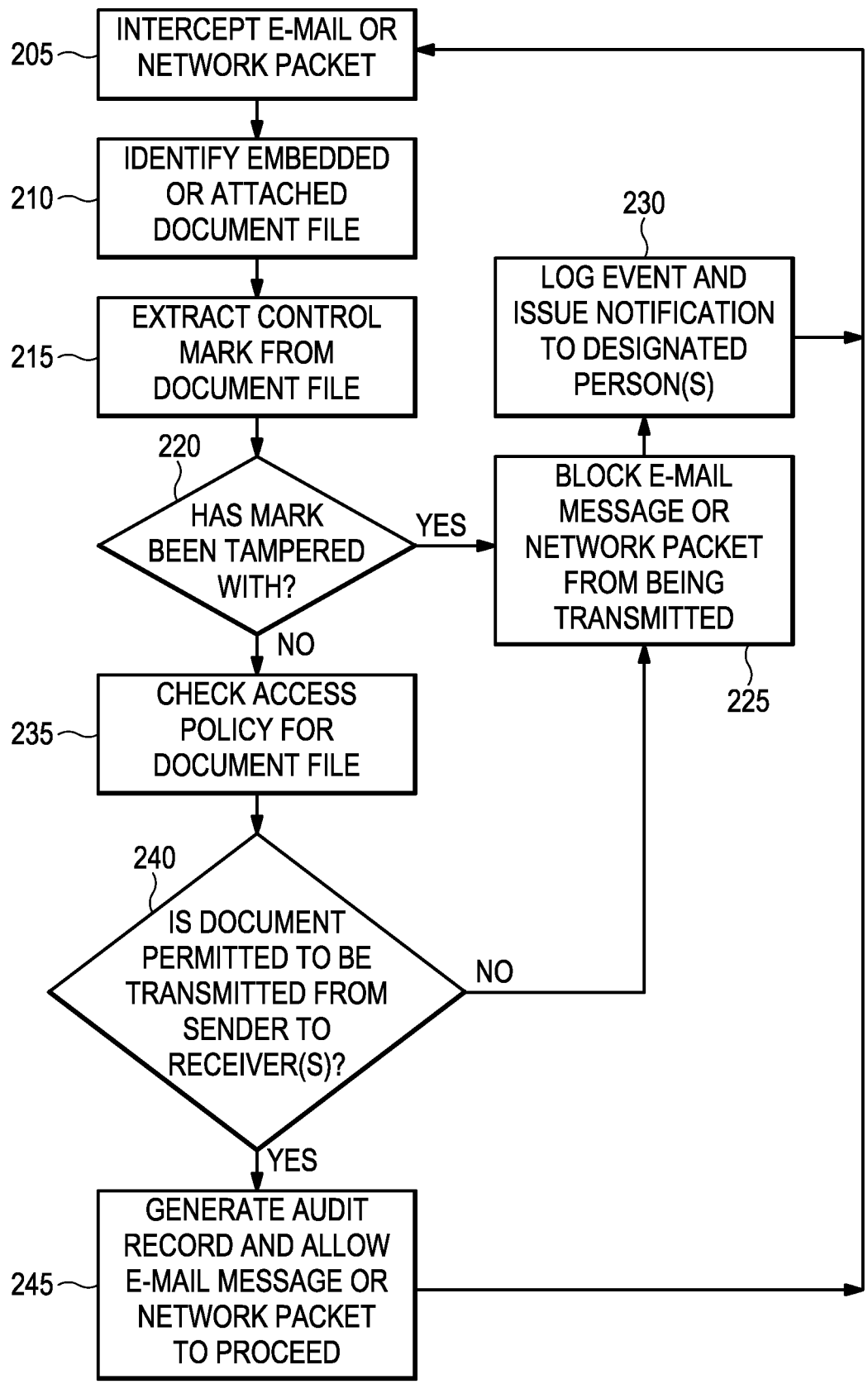
FIG. 2 is a simplified flowchart for a document route tracking method, in accordance with an embodiment of the present invention.

Reference is now made to FIG. 2, which is a simplified flowchart of a document route tracking method, in accordance with an embodiment of the present invention. At step 205 an e-mail message or network packet is intercepted. At step 210 an embedded or attached document file within the intercepted data is identified. At step 215 a control mark is extracted from the document. At step 220 a determination is made whether or not the control mark is intact, or has been tampered with. If the control mark has been tampered with, then at step 225 the e-mail message or network packet is blocked from being transmitted, and at step 230 the event is logged, a notification is sent to one or more specified people, and control returns to step 205.

Otherwise, if it is determined at step 220 that the control mark is intact, then at step 235 an access policy for the document is examined, and at step 240 a determination is made whether or not transmission of the document from its sender to its recipient(s) is permitted. If not, then at step 225 the e-mail message or network packet is blocked from being transmitted, and at step 230 the event is logged, a notification is sent to one or more specified people, and control returns to step 205.

Otherwise, if it is determined at step 240 that transmission of the document is permitted, then at step 245 an audit record is generated and transmission of the e-mail message or network packet is allowed to proceed, after which control returns to step 205.

Figure 3:
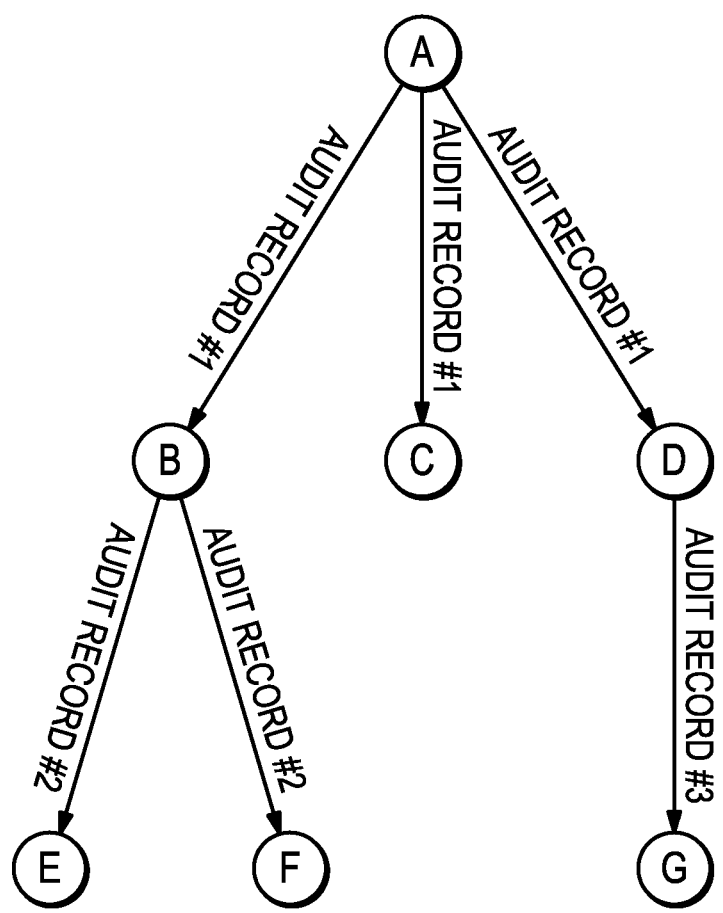
FIG. 3 is a simplified tree illustration for a distribution route for a document, recorded in accordance with an embodiment of the present invention.

Reference is now made to FIG. 3, which is a simplified tree illustration for a distribution route for a document, recorded in accordance with an embodiment of the present invention. As shown in FIG. 3, a document is transmitted from user A to users B, C and D within an e-mail message. Accordingly, the present invention identifies the document within the e-mail message by the unique identifier embedded therewithin, and records the transmission in an audit record #1. Audit record #1 preferably includes inter alia the following data:

AUDIT RECORD
TRANSACTION ID: 001
DOCUMENT ID: 001
SENDER: A
RECIPIENTS: B, C, D
DATE: Jan. 1, 2001
TIME: 6:30 AM

Subsequently, the document is further transmitted from user B to users E and F within another e-mail message, and the transmission is recorded in an audit record #2. Audit record #2 preferably includes inter alia the following data:

AUDIT RECORD
TRANSACTION ID: 002
DOCUMENT ID: 001
SENDER: B
RECIPIENTS: E, F
DATE: Jan. 2, 2001
TIME: 7:30 AM

Subsequently the document is transmitted from user C to user D within another e-mail message, and the transmission is recorded in an audit record #3. Audit record #3 preferably includes inter alia the following data:

AUDIT RECORD
TRANSACTION ID: 003
DOCUMENT ID: 001
SENDER: C
RECIPIENTS: G
DATE: Jan. 3, 2001
TIME: 8:30 AM

Taken together, audit records #1, #2 and #3 describe the entire document distribution route illustrated by the tree in FIG. 3.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

The invention claimed is:

1. A method, comprising:
    detecting an electronic message transmitted over a network based at least in part on identifying an electronic document embedded within or attached to the electronic message;
    extracting a control mark from the electronic document;
    generating an audit record by:
        tracking a routing path of the electronic message; and
        logging a sender, a recipient, a date, or a time associated with the electronic message based at least in part on detecting the electronic message;
    generating a tracking report corresponding to the electronic document, a specified user, or a specified time period; and
    blocking transmission of the electronic message based at least in part on determining tampering of the control mark,
    wherein the control mark remains embedded and unchanged in the electronic document after alteration of the electronic document.

2. The method of claim 1 wherein the electronic document is a Microsoft Word document.

3. The method of claim 1 wherein the electronic document is a Microsoft Excel spreadsheet.

4. The method of claim 1 wherein the electronic document is a Microsoft PowerPoint presentation.

5. The method of claim 1 wherein the electronic document is an Adobe PDF document.

6. The method of claim 1 wherein the electronic document is an HTML document.

7. The method of claim 1 wherein the electronic document is an XML document.

8. The method of claim 1 further comprising logging a date and time of transmission of the electronic message having the electronic document embedded therewithin or attached thereto, in an audit record, based at least in part on detecting the electronic message.

9. The method of claim 1 further comprising generating the tracking report from audit records corresponding to at least one specified user.

10. The method of claim 1 further comprising generating a tracking report from audit records corresponding to a specified time period.

11. The method of claim 1 further comprising logging a most recent file name of a file storing the electronic document, in an audit record, based at least in part on detecting the electronic message having the electronic document embedded therewithin or attached thereto.

12. The method of claim 1 further comprising authenticating the control mark.

13. The method of claim 12 further comprising issuing a notification based at least in part on authenticating the control mark.

14. The method of claim 1 further comprising:
examining an access control policy to determine whether to transmit the electronic document to a recipient of the electronic message having the electronic document embedded therewithin or attached thereto.

15. The method of claim 14 further comprising issuing a notification in response to the blocking.

16. A system, comprising:
a memory device configured to store instructions; and
a processing device configured to execute the instructions stored in the memory device to:
monitor e-mail messages transmitted from senders to recipients;
detect an e-mail message having an electronic document embedded therewithin or attached thereto, based on a unique identifier;
extract the unique identifier from the electronic document;
generate an audit record by tracking a routing path of the e-mail message and logging a sender, a recipient, a date, or a time associated with the e-mail message based at least in part on detecting the e-mail message
generate a tracking report corresponding to the electronic document, a specified user, or a specified time period; and
block transmission of the e-mail message based at least in part on determining tampering of the unique identifier,
wherein the unique identifier remains static in the electronic document regardless of alteration of the electronic document.

17. The system of claim 16 wherein the electronic document is a Microsoft Word document.

18. The system of claim 16 wherein the electronic document is a Microsoft Excel spreadsheet.

19. The system of claim 16 wherein the electronic document is a Microsoft PowerPoint presentation.

20. The system of claim 16 wherein the electronic document is an Adobe PDF document.

21. The system of claim 16 wherein the electronic document is an HTML document.

22. The system of claim 16 wherein the electronic document is an XML document.

23. The system of claim 16 wherein the processing device is configured to execute the instructions stored in the memory device further to generate the tracking report from a plurality of audit records, corresponding to at least one specified document, a specified user, or a specified time period.

24. The system of claim 16 wherein the processing device is configured to execute the instructions stored in the memory device further to log a most recent file name of a file storing the electronic document, in an audit record, based at least in part on detecting the e-mail message having the electronic document embedded therewithin or attached thereto.

25. The system of claim 16 wherein the processing device is configured to execute the instructions stored in the memory device further to authenticate the unique identifier.

26. The system of claim 25 wherein the processing device is configured to execute the instructions stored in the memory device further to issue a notification if said authenticating fails to authenticate the unique identifier.

27. The system of claim 16 wherein the processing device is configured to execute the instructions stored in the memory device further to:
examine an access control policy to determine whether permission is granted to transmit the electronic document to a recipient of the e-mail message having the electronic document embedded therewithin or attached thereto.

28. The system of claim 27 wherein the processing device is configured to execute the instructions stored in the memory device further to issue a notification based at least in part on determining that the access control policy does not grant permission to transmit the electronic document to the recipient.

* * * * *